(12) United States Patent
Helmy

(10) Patent No.: US 7,707,768 B2
(45) Date of Patent: May 4, 2010

(54) LANDSCAPE DEVICE

(76) Inventor: Ibrahim Helmy, 10041 Rafter S. Trail, Helotes, TX (US) 78023

( * ) Notice: Subject to any disclaimer, the term of this patent is extended or adjusted under 35 U.S.C. 154(b) by 0 days.

(21) Appl. No.: 11/738,470

(22) Filed: Apr. 21, 2007

(65) Prior Publication Data

US 2008/0256855 A1     Oct. 23, 2008

(51) Int. Cl.
*A01G 1/00*     (2006.01)
(52) U.S. Cl. .......................................... 47/33
(58) Field of Classification Search .............. 47/33, 47/31.1, 32, 21.1
See application file for complete search history.

(56) References Cited

U.S. PATENT DOCUMENTS

| | | | | |
|---|---|---|---|---|
| 313,424 | A * | 3/1885 | Hughes | 47/32 |
| 1,011,170 | A * | 12/1911 | Dennis | 47/31.1 |
| 3,005,287 | A * | 10/1961 | Dudley | 47/21.1 |
| 4,336,666 | A * | 6/1982 | Caso | 47/48.5 |
| 4,403,443 | A * | 9/1983 | Valente | 47/32 |
| 4,642,938 | A * | 2/1987 | Georges et al. | 47/2 |
| 4,858,378 | A * | 8/1989 | Helmy | 47/33 |
| 4,934,093 | A * | 6/1990 | Yanna | 47/33 |

* cited by examiner

*Primary Examiner*—Michael R Mansen
*Assistant Examiner*—Monica L Williams

(57) ABSTRACT

A landscape device having a growth section surrounded by at least one upwardly-extending wall. Located within the growth section are a plurality of displaceable elements which are capable of being displaced by the growth of a plant located in the growth section of the landscape device. A second upwardly-extending wall may be located between the first upwardly-extending wall and the growth section, forming a reservoir between the walls. Water, soil, and other elements may be placed in the reservoir, which will contain weep holes to permit passage of water into the underlying ground. A cover plate may be positioned over the reservoir to inhibit evaporation of water. The cover plate may also include a fitting for connecting to a water source such as a hose. A method for manufacturing variations of the landscape device is also disclosed.

16 Claims, 7 Drawing Sheets

*Fig. 3*
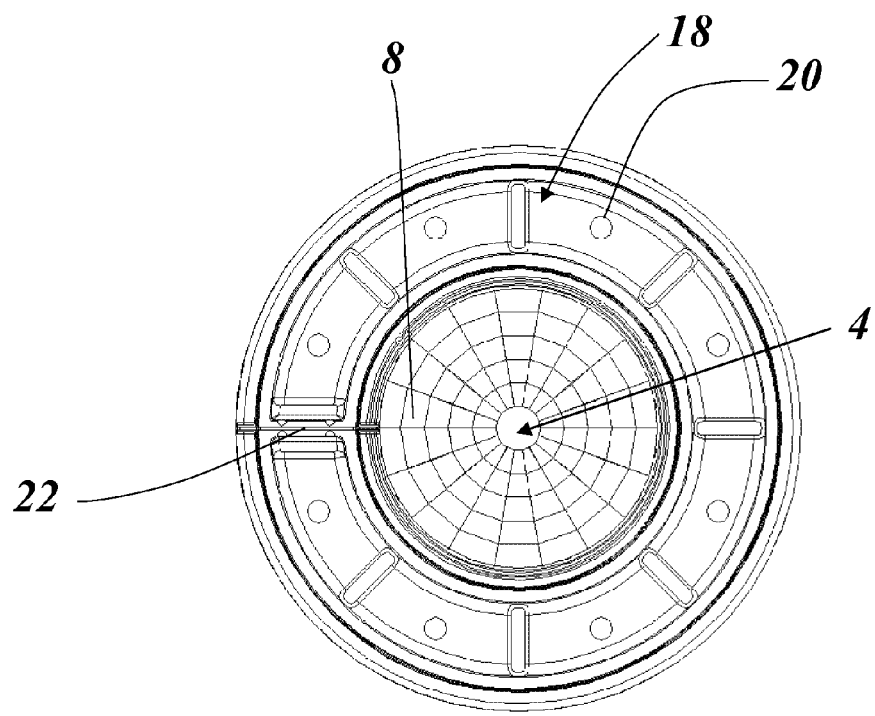
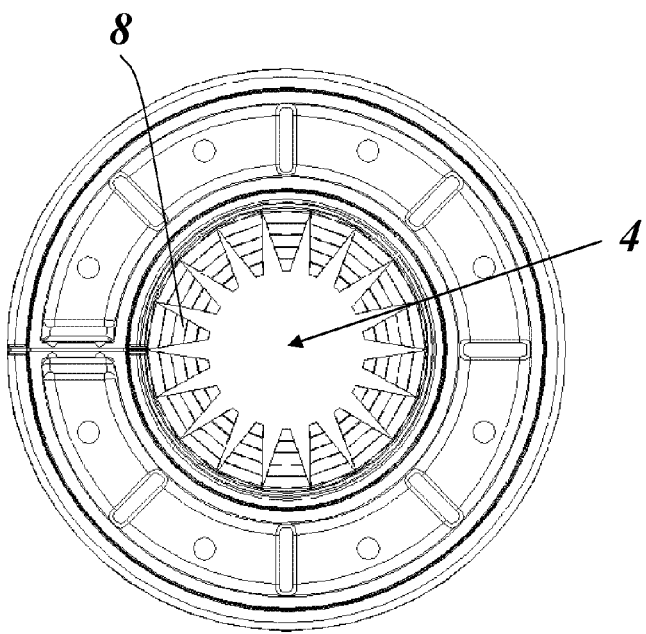
*Fig. 4*

LANDSCAPE DEVICE

BACKGROUND OF INVENTION

1. Field of the Invention

The invention relates generally to a landscape device for use in outdoor landscaping applications, and more particularly to a landscape device having components which are displaceable during plant growth.

2. Background Art

Landscape devices of various types and configurations have been utilized to provide a barrier to undesired vegetative growth around the base of a plant, such as a tree or shrub. In addition to preventing growth of undesired vegetation, some such devices also provide a support and retaining system for various landscape elements such as gravel or wood chips. Furthermore, such devices also protect a centrally located plant from damage from various landscaping tools. Although reasonably effective with respect to these objectives, current configurations often hinder growth of a plant positioned therein by restricting circumferential expansion of the base of the plant, sometimes resulting in damage to the plant. Accordingly, there is a need for a landscape device that provides a barrier to undesired vegetative growth while accommodating growth of a plant disposed therein.

SUMMARY OF INVENTION

In one embodiment, the invention relates to a landscape device having a growth section which includes a plurality of displaceable elements, each of which has at least one crease or perforation disposed therethrough, typically across a longitudinal axis. The growth section is surrounded by at least one upwardly-extending wall. In one embodiment, two upwardly-extending walls surround the growth section, one within the other, thereby forming a reservoir therebetween. An outwardly-extending flange may operatively connect to an outer wall of the device, providing increased stability which is facilitated by vegetative growth over the flange. At least one weep hole is formed in a lower surface of the reservoir, when present, to allow passage of water therethrough. At least one seam radiates outwardly from the growth section to permit a desired opening of the device such that a plant may be disposed therein.

In one embodiment, the invention relates to a method for manufacturing a landscape device, including placing a relatively flat sheet of plastic, which may be continuous with a roll of plastic, into a thermoforming machine, heating the plastic to a desired temperature within the machine, stretching the plastic over a mold in the shape of an embodiment of the landscape device as disclosed herein, and removing the molded product from the machine. Displaceable element, perforations and/or creases may be formed in the landscape device either within the mold, or after removal of the molded product. Vacuum pressure may also be applied within the machine to cause an increased contact between the plastic and the mold.

In one embodiment, the invention relates to a landscape kit, including a landscape device according to an embodiment described herein, a cover plate according to an embodiment described herein, and a plurality of fasteners for fastening the cover plate to the landscape device.

Other aspects and advantages of the invention will be apparent from the following description and the appended claims.

BRIEF DESCRIPTION OF DRAWINGS

FIG. 3 is a top view of one embodiment of the invention showing the displaceable elements in a non-displaced configuration.

FIG. 4 is a top view of one embodiment of the invention showing a plurality of displaceable elements in a displaced configuration.

DETAILED DESCRIPTION

As used herein, the term "displace" and variations thereof means to cause a movement of a first thing, typically due to occupation of the same space by a second thing. In a typical application of the term herein, a base portion of a plant will displace a described element of an embodiment of a landscape device, typically due to growth and expansion of the base portion into the space previously occupied by the described element of an embodiment of the landscape device. Displacement may occur in any direction, although embodiments of the invention will typically relate to relatively horizontal displacement due to horizontal (circumferential) expansion of a plant base. The degree of displacement will typically vary during plant growth, usually increasing as the plant grows. Displacement may also be manually initiated by a user.

Figure 1:
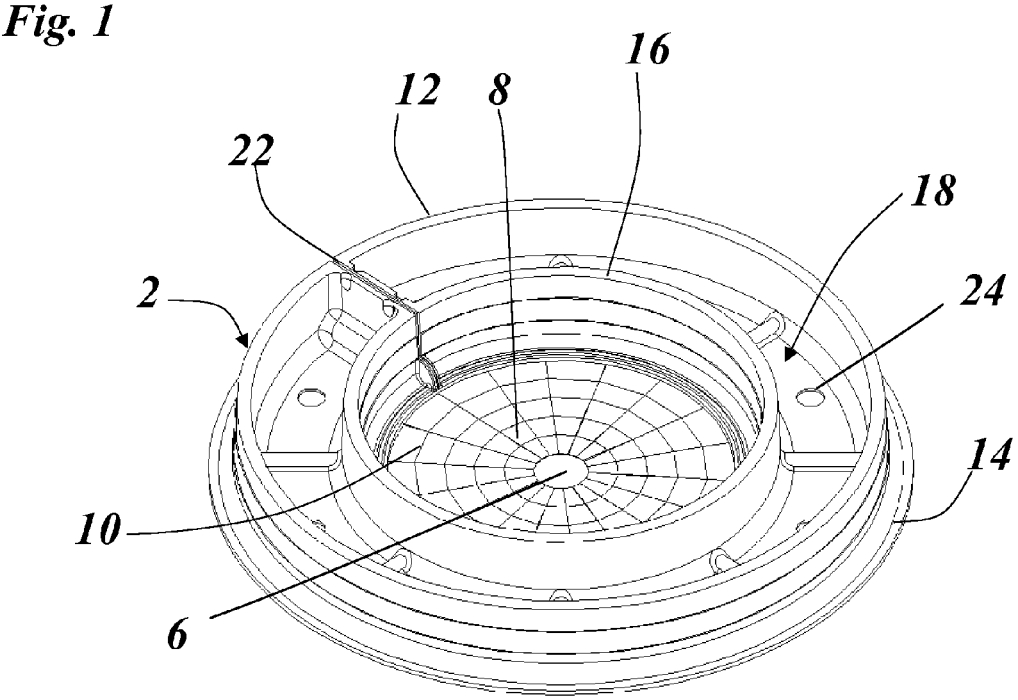
FIG. 1 is an isometric view of one embodiment of the invention showing the displaceable elements in a non-displaced configuration.

As shown in FIG. 1, in one embodiment the invention comprises a landscape device 2 positionable on the ground around the base of a tree or other relatively vertical object. The landscape device 2 includes a centrally-located growth section 4 which may include an initial opening 6 in the center thereof. Disposed within the growth section 4 are a plurality of displaceable elements 8. The displaceable elements 8 may include a plurality of creases or perforations 10 configured to facilitate displacement of the displaceable elements 8. In one embodiment, the creases or perforations 10 will be disposed such that they will be relatively parallel to an expected external circumference of a plant disposed in the growth section 4, typically in ring-like configurations (e.g., concentric to a center of a growth section 4). In one embodiment, the creases or perforations 10 will be disposed relatively perpendicular to a longitudinal axis of the displaceable elements 8. The displaceable elements 8 may be thinner than, and/or comprise a different material than other components of the landscape device, advantageously facilitating their displaceability. In one embodiment, creases or perforations 10 may also be disposed at an operative connection between adjoining displaceable elements 8. Such a configuration advantageously maintains the displaceable elements 8 in a relatively planar configuration prior to displacement, while permitting each displaceable element 8 to be individually displaced.

Figure 2:
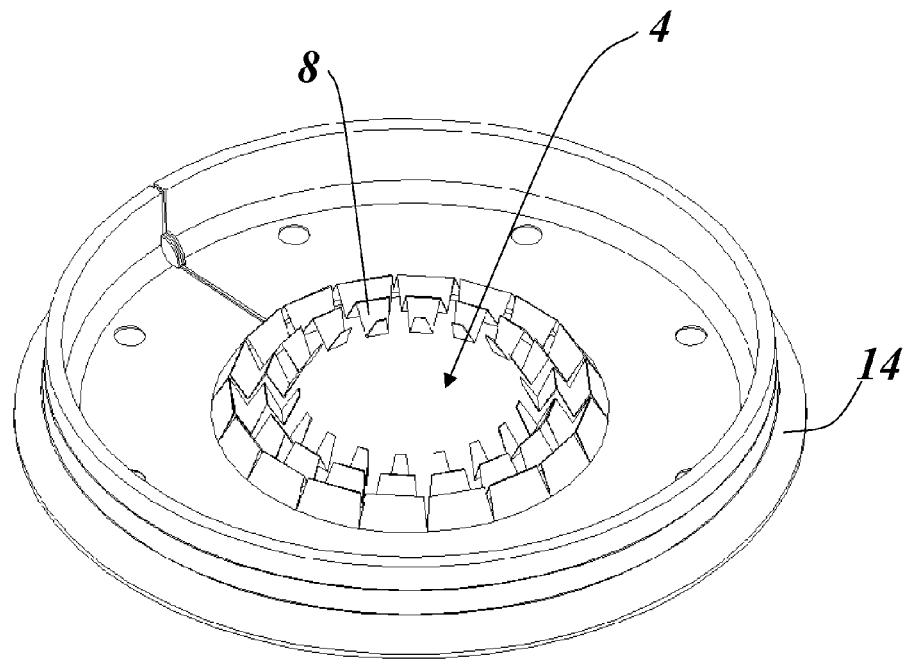
FIG. 2 is an isometric view of one embodiment of the invention showing a plurality of displaceable elements in a displaced configuration.

As shown in FIG. 2, the displaceable elements 8 are configured to be pushed away from the center of the landscape device 2, typically due to growth of a plant disposed therein. FIGS. 3 and 4 show a top view of such displacement and the resulting expansion of the central opening of the growth section 4 to accommodate plant growth therein. In various embodiments, the growth section 4 need not include a central opening, but instead the displaceable elements 8 may extend into the center of the growth section 4, meeting at a central point.

As used herein, the term "centrally located" means disposed in a location at or near the center of the landscape device 2. Some variation from a centerline is permissible. Furthermore, in certain embodiments it may be desirable to dispose a plurality of growth sections 4 within the landscape device 2. In such embodiments, the individual growth sections 4 may be disposed in any desired plurality of locations.

Perforations 10 advantageously facilitate displacement and bias such displacement to a relatively horizontal direction, which is particularly advantageous when landscape elements (e.g., stones, wood chips, etc.) are disposed atop the displaceable elements 8 within the growth section. An additional advantage of such a configuration is a decreased likelihood that displaceable elements 8 will be forced upwards through any landscape elements and become visible as they are displaced, which would result in a less aesthetically appealing appearance. Instead, the displaceable elements 8 will have a relatively horizontal displacement which will increase the likelihood they remain hidden beneath any covering landscape elements.

As shown in FIG. 2, in one embodiment, the landscape device 2 comprises an upwardly-extending outer wall 12 operatively connected to, and surrounding, the growth section 4. The outer wall 12 may include an outwardly-extending flange 14 along its outer periphery. The flange 14 is configured to permit the growth of grass or other vegetation over at least a portion thereof, thereby advantageously stabilizing the landscape device 2. Stabilization due to such growth advantageously lessens the need for stakes or other mechanical fasteners, which are typically rendered less effective by the expansion and contraction of the underlying ground due to environmental temperature changes. The flange 14 may be of any configuration known in the art, and in one embodiment may include a concave upper surface.

Figure 6:
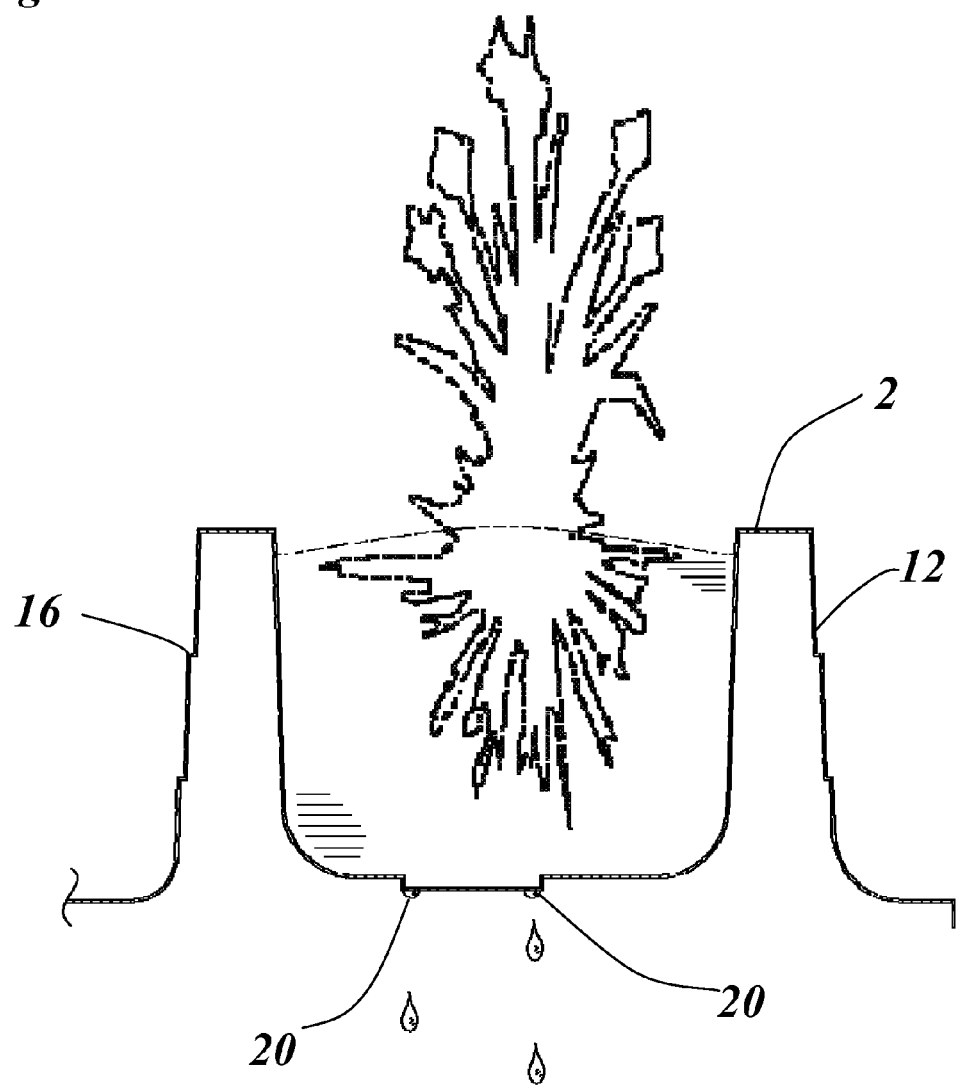
FIG. 6 is a cross-sectional view of a reservoir section according to one embodiment of the invention, having soil and a plant disposed therein.

Referring again to FIG. 1, in one embodiment, the landscape device 2 further comprises an upwardly-extending inner wall 16 disposed between the outer wall 12 and growth section 4. In such a configuration, a reservoir 18 is formed between the inner wall 16 and outer wall 12. The reservoir 18 will advantageously retain water, landscape elements (e.g., stones, wood chips, etc.) and/or soil disposed therein. As shown in FIG. 3, at least one weep hole 20 is disposed in a lower portion of the reservoir 18, to permit water and other nutrients to flow into the ground below the landscape device 2. Any desired number, size, and configuration of weep holes 20 may be disposed within the reservoir 18 at any one or more desired locations. Smaller weep holes 20 may advantageously limit the passage of water out of the reservoir resulting in a controlled time-release of water into the underlying ground, containing the roots of any plant disposed in the growth section 4. Such a configuration advantageously permits increased intervals between waterings. Smaller weep holes 20 will also advantageously retain more soil and water within the reservoir 18, facilitating the growth of any plants disposed therein, as shown in FIG. 6.

Referring again to FIG. 1, in one embodiment at least one seam 22 is disposed in the outer wall 12 and passes through any intervening elements to the growth section 4. The seam 22 may comprise a crease, perforation, visual indicator, and/or any other configuration that facilitates the separation of two sections of the landscape device 2 along a predetermined line (or through a predetermined region if the seam 22 is non-linear) extending from the growth section 4 through the outer wall 12 and/or flange 14, if present. Such separation of two or more sections of the landscape device 2 facilitates the placement of the landscape device 2 around the base of a plant.

As shown in FIGS. 1 and 2, in one embodiment elements of the landscape device 2 on either side of the seam 22, are configured to accommodate fasteners which may be used to effectively close the seam 22 once the landscape device 2 is disposed around the base of a plant. Such fasteners may be of any type known in the art, including but not limited to, twist ties and zip ties, and the configuration of embodiments of the landscape device 2 may vary to accommodate any predetermined fastener type(s). Alternatively, in one embodiment, the landscape device may include an element on one side of the seam 22 configured to mate or otherwise operatively connect to a second element on a second side of the seam 22. In one embodiment, elements of the landscape device 2 on either side of the seam 22 extend upwardly, advantageously reducing spillage of water from the reservoir 18.

Figure 5:
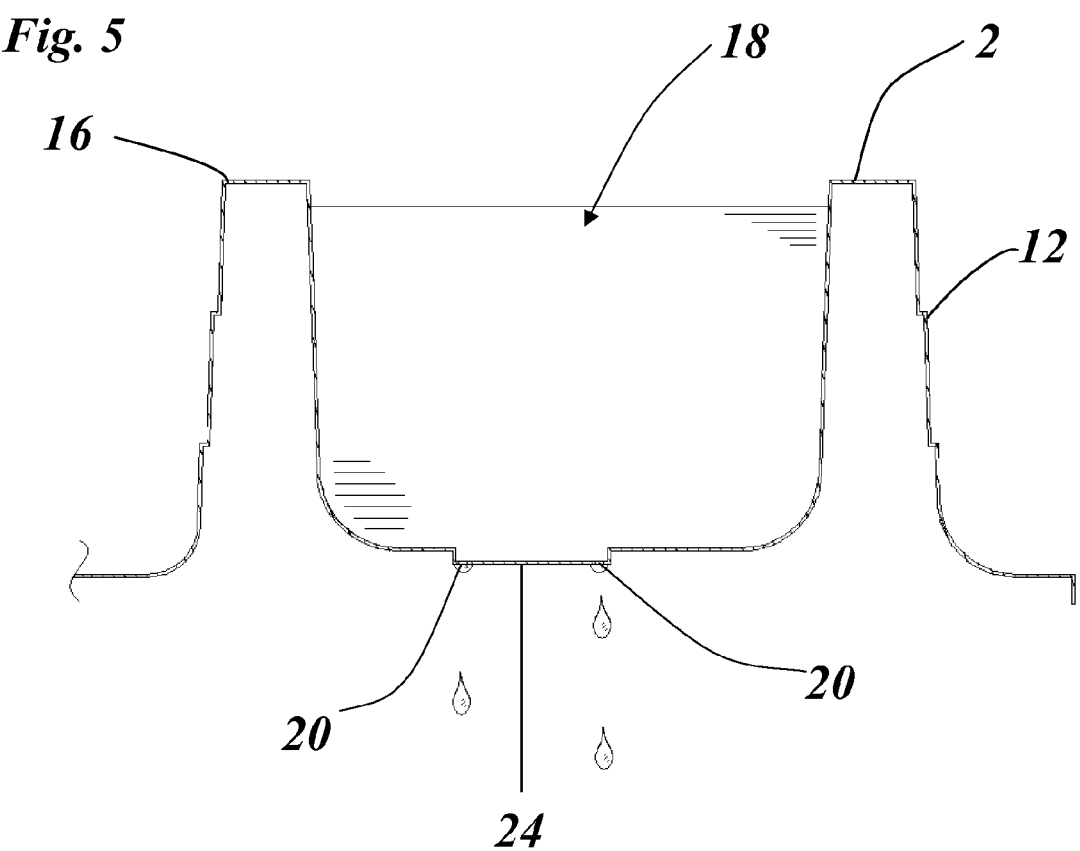
FIG. 5 is a cross-sectional view of a reservoir section according to one embodiment of the invention.

As shown in the embodiment of FIG. 5, the inner wall 16 and outer wall 12 may be of any desired height. In one embodiment, the inner wall 16 and outer wall 12 will have the same height. In one embodiment, the inner wall 16 will be lower than the outer wall, thereby advantageously ensuring that any excess water disposed in the reservoir 18 will flow over the inner wall 16 towards a plant disposed in the growth section 4, and not over the outer wall 12 away from the growth section 4. Furthermore, in one embodiment, weep holes 20 may be disposed in concavities 24 in the bottom of the reservoir 18 thereby advantageously increasing the likelihood that any water disposed in the reservoir 18 will pass through the weep holes 20.

In various embodiments, the bottom of the reservoir 18 may be raised such that it will be slightly elevated over the ground, thereby advantageously facilitating drainage of the reservoir 18. Alternatively, the bottom of the reservoir 18 may be flush with the bottom of one or more other elements of the landscape device 2. As shown in FIG. 6, the reservoir 18 may be filled with soil, such that a plant may be disposed therein.

Figure 7:
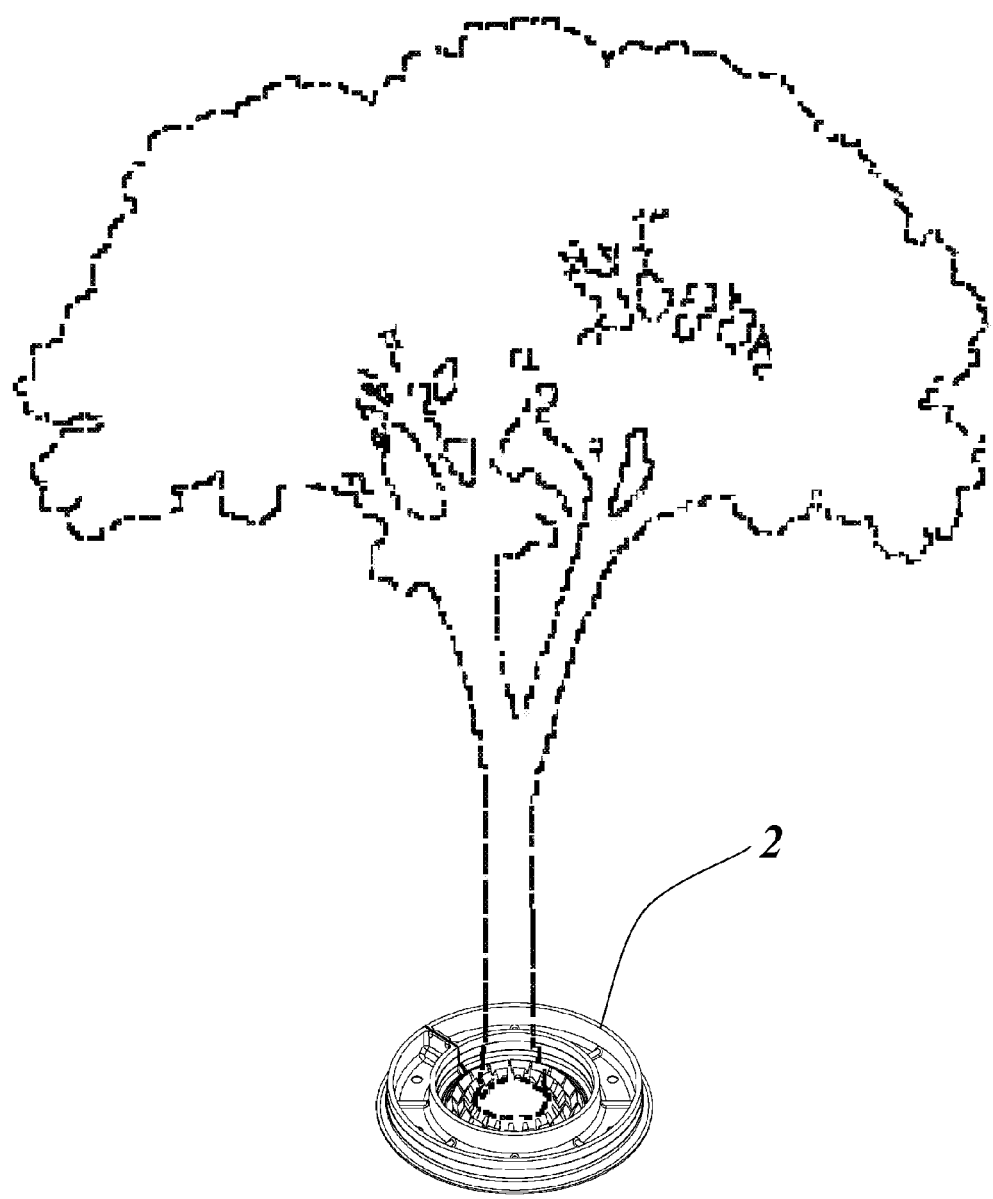
FIG. 7 is an isometric view of one embodiment of the invention disposed around the trunk of a tree.

As shown in FIG. 7, embodiments of the landscape device 2 will advantageously accommodate the growth of a plant disposed in the growth section 4 thereof due to the displacement of displaceable elements 8. Such configurations advantageously allow relatively unrestricted growth of the plant without damage thereto caused by constriction of a trunk thereof. Furthermore, such configurations advantageously maintain their location because plant growth will typically displace only the displaceable elements, instead of causing undesirable movement of the entire landscape device 2.

Figure 8:
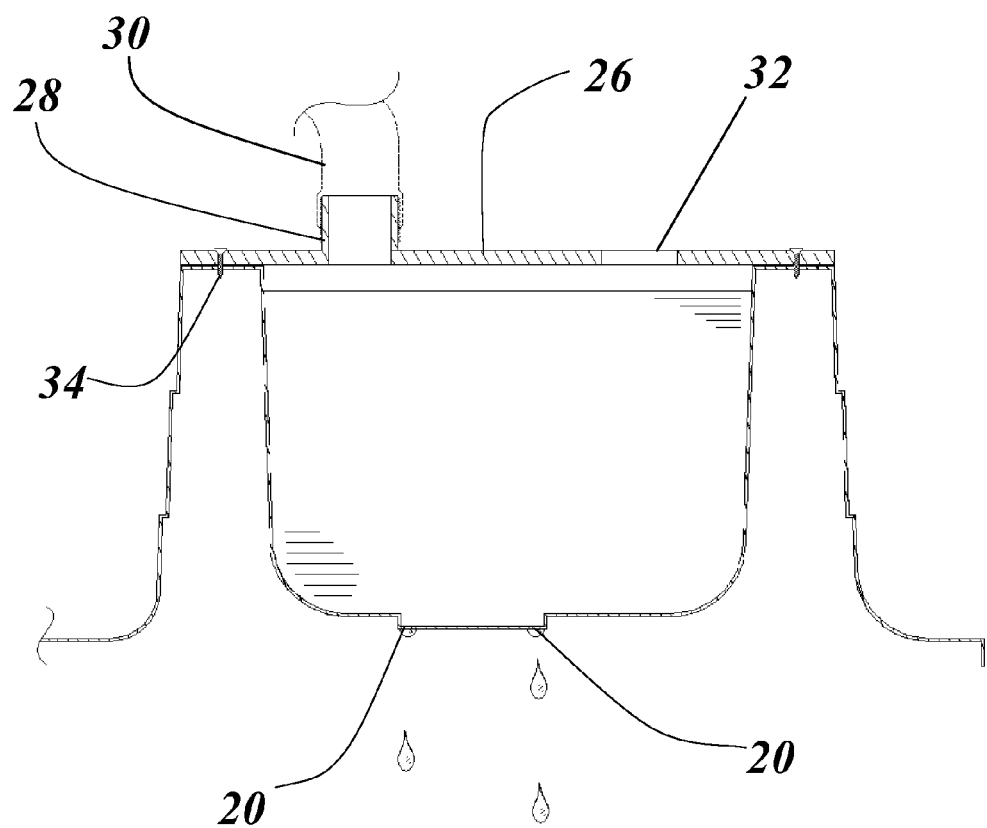
FIG. 8 is a cross-sectional view of a reservoir and operatively connected cover plate, according to one embodiment of the invention.

As shown in FIG. 8, in one embodiment the invention comprises a cover plate 26 for operatively connecting to the landscape device 2 over the reservoir 18. In one embodiment, the size and shape of the cover plate 26 will correspond to the size and shape of a predetermined reservoir 18. The cover plate 26 includes at least one opening 28 therethrough for the passage of water and other desired elements. In one embodiment, the opening 28 is configured to be a fitting for operatively connecting to a water source, such as a hose 30. A view port 32 may also be disposed in the cover plate 26 to allow for a determination of the water level within the reservoir 18 when the cover plate 26 is operatively connected to the landscape device 2. The view port 32 may be open, openable, or sealed with a transparent or semi-transparent cover.

Although shown in the embodiment of FIG. 8 as having a relatively planar surface, the cover plate 26 maybe of any desired configuration. In one embodiment, the cover plate 26 may include a convex or sloped upper surface to prevent the accumulation of water thereon. In one embodiment, the upper surface of the cover plate 26 may be decorative (e.g., shaped to resemble stones or other landscape elements, configured to include a raised motif, etc.). In one embodiment, the upper surface of the cover plate 26 may be concave or otherwise form a cavity for the placement and retention of landscape elements disposed therein.

The cover plate 26 may operatively connect to the inner wall 16 and/or outer wall 12 by any means known in art. As shown in FIG. 8, fasteners 34, such as screws, may operatively connect the cover plate 26 to an upper surface of the inner and/or outer wall 16, 12. Fasteners 34 may be of any type known in the art. Alternatively, the cover plate 26, outer wall 12, and/or inner wall 16 may include mating components, or otherwise be configured such that the cover plate 26 may be operatively connected to either wall (12, 16) without the use of separate fasteners 34. For example, the cover plate 26 may be configured to have a lip extending downwardly along an inner or outer periphery thereof, which will prevent displacement of the cover plate 26 when it is disposed on the landscape device 2. Other configurations may include, but are not limited to, threading and/or coupling configurations.

Figure 9:
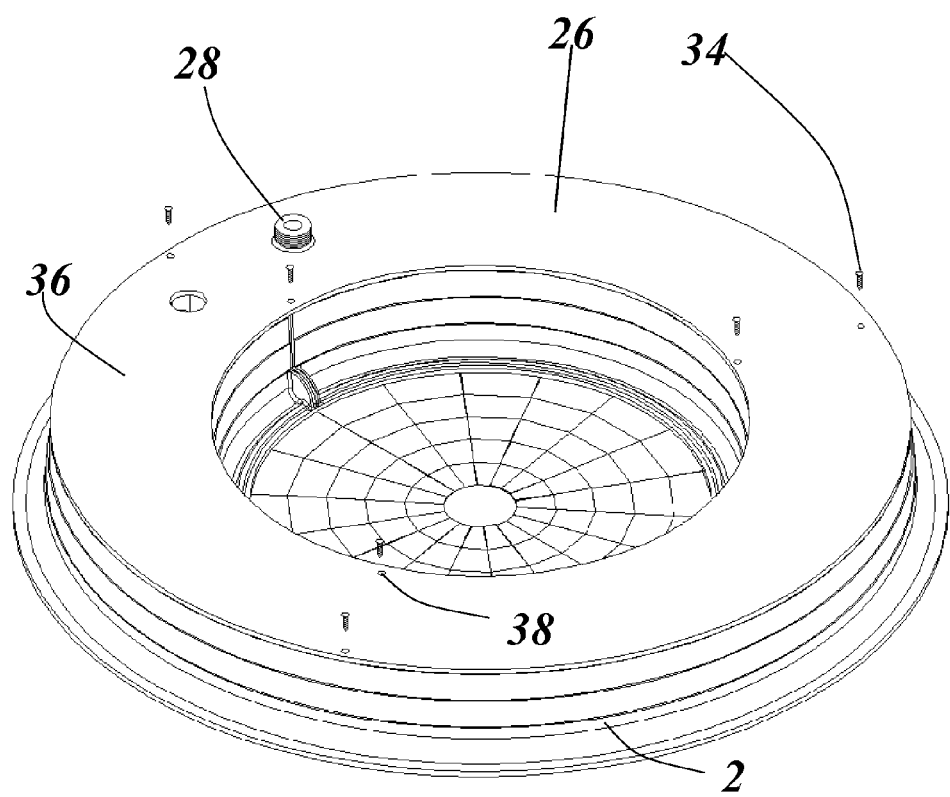
FIG. 9 is an isometric view of one embodiment of the invention showing the placement of a cover plate over a reservoir.

As shown in the embodiment of FIG. 9, the cover plate 26 will typically include at least one seam 36 for facilitating positioning around a plant disposed in a landscape device 2. The cover plate 26 may include one or more holes 38 for the passage of fasteners 34 therethrough. Such holes 38 advantageously guide the positioning of fasteners 34 in desired locations thereby facilitating the operative connection of cover plate 26 and landscape device 2. The use of a cover plate 26 according to various embodiments of the invention advantageously decreases the rate of evaporation of water disposed in the reservoir 18. In one embodiment, the landscape device 2 and cover plate 26 may be formed as a unitary device. In one embodiment, the cover plate 26 may be permanently connected to the landscape device 2, for example by ultrasonic welding, or by any other means known in the art. In various embodiments, a single seam may be formed in the combined device, or alternatively, the seams may be slightly offset in the landscape device 2 and cover plate 26, advantageously stabilizing the combined unit.

Although shown and described as a generally circular device, embodiments of the invention may be of any desired size and shape, including but not limited to square, rectangular, polygonal, triangular, or any other shape known in the art. Embodiments of the landscape device 2 and components thereof may comprise any material known in the art and/or combinations thereof. Furthermore, embodiments of the invention may comprise any color known in the art, combinations thereof, and/or include decorative features. In one embodiment, the landscape device 2 and/or any cover plate 26 may each comprise a single molded sheet of resilient plastic.

In use, landscape elements (e.g., stones, wood chips, etc.) may be placed on top of any surface of embodiments of the landscape device 2. For example, landscape elements may be disposed within the growth section 8, reservoir 18, and/or on top of a cover plate 26. The ability to dispose and retain landscape elements in a desired location advantageously facilitates the achievement of a desired landscape appearance. For example, stones of one color may be disposed in the growth section 8 while those of another color may be placed in the reservoir 18. Alternatively, stones may be disposed in the growth section 8 while plants are grown in soil disposed in the reservoir 18, as shown in FIG. 6. Stones are utilized herein as a representative example of a landscape element, and any such elements known in the art may be similarly used with the landscape device 2.

In one embodiment, the invention comprises a method of manufacturing a landscape device according to at least one embodiment described herein, the method comprising positioning a relatively flat sheet of plastic (which may be continuous with a roll of plastic) within a thermoforming machine, heating the plastic to a predetermined temperature, stretching the plastic over a mold disposed within the thermoforming machine to form a landscape device or component thereof as described herein, and removing the landscape device or component thereof from the machine. In one embodiment, vacuum pressure may also be utilized to increase the contact surface area between plastic and mold. In one embodiment, creases, slits, and/or perforations as described herein may be disposed in the landscape device within the thermoforming machine. In one embodiment, creases, slits, and/or perforations as described herein are disposed in the landscape device after removal from the thermoforming machine.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A landscape device, comprising:
    a growth section having a plurality of generally wedge-shaped displaceable elements disposed therein, the displaceable elements disposed radially about, and extending outwardly from, an opening disposed in the growth section, wherein at least one selected from a plurality of creases, and a plurality of rows of perforations, and a combination of a crease and a perforation is disposed in at least one of the plurality of displaceable elements, the at least one selected from a crease and a perforation oriented substantially transverse to a longitudinal axis of the at least one of the plurality of displaceable elements; and
    an upwardly-extending outer wall operatively connected to, and surrounding, the growth section.

2. The landscape device of claim 1, further comprising an outwardly-extending flange operatively connected to the upwardly-extending outer wall.

3. The landscape device of claim 2, wherein the outwardly-extending flange comprises a concave configuration.

4. The landscape device of claim 1, further comprising an upwardly-extending inner wall disposed between the upwardly-extending outer wall and the growth section and operatively connecting to the upwardly-extending outer wall such that at least one reservoir is formed between the upwardly-extending inner wall and the upwardly-extending inner wall.

5. The landscape device of claim 4, further comprising at least one weep hole disposed in a lower surface of the at least one reservoir.

6. The landscape device of claim 5, wherein the at least one weep hole is disposed in a concavity formed in the lower surface of the at least one reservoir.

7. The landscape device of claim 4, further comprising at least one seam extending from the growth section through an outer periphery of the landscape device.

8. The landscape device of claim 7, wherein predetermined adjoining locations on opposite sides of the seam are configured to operatively connect to a fastener.

9. The landscape device of claim 7, wherein a first element in a first predetermined location on one side of the seam is configured to reversibly connect to a second element in a second predetermined location on a second side of the seam.

10. The landscape device of claim 4, wherein the upwardly-extending outer wall has a height that is greater than that of the upwardly-extending inner wall.

11. The landscape device of claim 4, further comprising a cover plate disposed over a significant portion of the at least one reservoir, the cover plate including at least one opening for passage of water therethrough.

12. The landscape device of claim 11, wherein the at least one opening is configured to be a fitting for operatively connecting to a water source.

13. The landscape device of claim 11, wherein the cover plate further comprises at least one view port.

14. The landscape device of claim 11, wherein the cover plate further comprises an upper surface configured to be at least one selected from convex, concave, sloped, and decorative.

15. The landscape device of claim 1, further comprising at least one seam disposed such that it extends from the growth section through an outer periphery of the landscape device.

16. A landscaping kit, comprising:
a landscape device including, 1) a growth section in which are disposed a plurality of generally wedge-shaped displaceable elements radiating from an opening in the landscape device, wherein at least one selected from a crease and a perforation is disposed in individual members of the plurality of displaceable elements, the at least one selected from a plurality of creases, and a plurality of rows of perforations, and a combination of a crease and a perforation oriented substantially transverse to a longitudinal axis of the individual member, and 2) an upwardly-extending inner wall operatively connected to the growth section and operatively connected to an upwardly-extending outer wall, such that at least one reservoir is formed between the upwardly-extending inner wall and the upwardly-extending outer wall; and
a cover plate operatively connectible to the landscape device over the at least one reservoir, the cover plate comprising at least one opening for passage of water therethrough; and a plurality of fasteners for fastening the cover plate to the landscape device.

* * * * *